US008752089B2

(12) United States Patent
Feldstein et al.

(10) Patent No.: US 8,752,089 B2
(45) Date of Patent: Jun. 10, 2014

(54) DYNAMIC DETERMINATION OF PRESENTATION OF MULTIPLE VIDEO CELLS IN AN ON-SCREEN DISPLAY

(75) Inventors: David E. Feldstein, Santa Monica, CA (US); Jon M Dean, Palos Verdes Estates, CA (US); Mark A. Shurgot, Hollyglen, CA (US); Edgar C. Camacho, Torrance, CA (US); Matthew J. Thompson, El Segundo, CA (US); David Eric Shanks, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1217 days.

(21) Appl. No.: 11/716,310

(22) Filed: Mar. 9, 2007

(65) Prior Publication Data

US 2007/0214478 A1  Sep. 13, 2007

Related U.S. Application Data

(60) Provisional application No. 60/781,061, filed on Mar. 10, 2006.

(51) Int. Cl.
| G06F 3/00 | (2006.01) |
| G06F 13/00 | (2006.01) |
| H04N 5/445 | (2011.01) |
| H04N 7/16 | (2011.01) |
| H04N 7/167 | (2011.01) |
| H04N 7/173 | (2011.01) |

(52) U.S. Cl.
USPC ............... 725/38; 725/27; 725/31; 725/131

(58) Field of Classification Search
None
See application file for complete search history.

(56) References Cited

U.S. PATENT DOCUMENTS 5,235,643 A  8/1993  Anderson et al.
5,554,980 A  9/1996  Hashimoto et al.
(Continued)

FOREIGN PATENT DOCUMENTS

EP  1225768 A1  7/2002
EP  1233614     8/2002
(Continued)

OTHER PUBLICATIONS

Final Rejection dated Jan. 21, 2010 in U.S. Appl. No. 11/390,657, filed Mar. 28, 2006 by Richard F. Purpura et al.
(Continued)

*Primary Examiner* — Mark D Featherstone

(57) ABSTRACT

A mosaic video channel displayed on a monitor, with a plurality of individual video feeds being presented at a given time. A mosaic video channel in accordance with the present invention comprises a plurality of video cells presenting at least video information, each video cell associated with one of the plurality of individual video feeds, a cursor, which can be moved between the plurality of video cells, for selecting at least one characteristic associated with a selected video cell, such that the user can then directly select a video program associated with the selected video cell, and a receiver, coupled to the monitor and receiving the plurality of video feeds and mosaic video channel, wherein a blackout criteria is dynamically programmed into the receiver such that when at least one of the video cells is selected by the cursor, the receiver tunes to a channel other than the individual video feed associated with that video cell.

11 Claims, 5 Drawing Sheets

(56) References Cited

U.S. PATENT DOCUMENTS

| | | | |
|---|---|---|---|
| 5,652,628 | A | 7/1997 | Toyoshima et al. |
| 5,714,997 | A | 2/1998 | Anderson |
| 5,946,051 | A | 8/1999 | Bril |
| 6,002,394 | A | 12/1999 | Schein et al. |
| 6,009,116 | A | 12/1999 | Bednarek et al. |
| 6,092,806 | A | 7/2000 | Follis |
| 6,135,881 | A | 10/2000 | Abbott et al. |
| 6,154,771 | A | 11/2000 | Rangan et al. |
| 6,177,931 | B1 | 1/2001 | Alexander et al. |
| 6,263,501 | B1 | 7/2001 | Schein et al. |
| 6,347,086 | B1 | 2/2002 | Strachan |
| 6,371,855 | B1 | 4/2002 | Gavriloff |
| 6,396,473 | B1 | 5/2002 | Callahan et al. |
| 6,405,371 | B1 | 6/2002 | Oosterhout et al. |
| 6,501,514 | B1 | 12/2002 | Townsend et al. |
| 6,526,577 | B1 | 2/2003 | Knudson et al. |
| 6,536,041 | B1 | 3/2003 | Knudson et al. |
| 6,544,121 | B2 | 4/2003 | DeWeese et al. |
| 6,593,973 | B1 | 7/2003 | Sullivan et al. |
| 6,604,240 | B2 | 8/2003 | Ellis et al. |
| 6,669,565 | B2 | 12/2003 | Liegey |
| 6,750,919 | B1 | 6/2004 | Rosser |
| 6,762,798 | B1 | 7/2004 | Messer et al. |
| 6,772,435 | B1 | 8/2004 | Thexton et al. |
| 6,802,077 | B1 | 10/2004 | Schlarb |
| 6,898,762 | B2 | 5/2005 | Ellis et al. |
| 7,010,492 | B1 | 3/2006 | Bassett et al. |
| 7,146,329 | B2 | 12/2006 | Conkwright et al. |
| 7,146,615 | B1 | 12/2006 | Hervet et al. |
| 7,174,512 | B2 | 2/2007 | Martin et al. |
| 7,370,343 | B1 * | 5/2008 | Ellis .................................. 725/58 |
| 7,563,162 | B2 | 7/2009 | Lawson et al. |
| 7,757,252 | B1 | 7/2010 | Agasse |
| 7,856,646 | B1 | 12/2010 | Groff et al. |
| 8,037,494 | B2 | 10/2011 | Sie et al. |
| 2002/0010931 | A1 | 1/2002 | Chew et al. |
| 2002/0019981 | A1 | 2/2002 | Schein et al. |
| 2002/0035728 | A1 | 3/2002 | Fries |
| 2002/0038458 | A1 | 3/2002 | Staal et al. |
| 2002/0054088 | A1 | 5/2002 | Tanskanen et al. |
| 2002/0056087 | A1 | 5/2002 | Berezowski et al. |
| 2002/0067376 | A1 | 6/2002 | Martin et al. |
| 2002/0069419 | A1 | 6/2002 | Raverdy et al. |
| 2002/0099800 | A1 | 7/2002 | Brainard et al. |
| 2002/0112238 | A1 | 8/2002 | Kanojia et al. |
| 2002/0124255 | A1 | 9/2002 | Reichardt et al. |
| 2002/0157101 | A1 | 10/2002 | Schrader et al. |
| 2002/0166123 | A1 | 11/2002 | Schrader et al. |
| 2002/0170068 | A1 | 11/2002 | Rafey et al. |
| 2002/0188958 | A1 | 12/2002 | Miller |
| 2003/0007092 | A1 | 1/2003 | Sonner et al. |
| 2003/0011715 | A1 | 1/2003 | Kastelic |
| 2003/0014752 | A1 | 1/2003 | Zaslavsky et al. |
| 2003/0060250 | A1 | 3/2003 | Chan |
| 2003/0079226 | A1 | 4/2003 | Barrett |
| 2003/0084441 | A1 | 5/2003 | Hunt |
| 2003/0110495 | A1 | 6/2003 | Bennington et al. |
| 2003/0115585 | A1 | 6/2003 | Barsness et al. |
| 2003/0126605 | A1 | 7/2003 | Betz et al. |
| 2003/0204852 | A1 | 10/2003 | Fenwick et al. |
| 2003/0208755 | A1 | 11/2003 | Zimmerman |
| 2004/0045026 | A1 | 3/2004 | Baril et al. |
| 2004/0060061 | A1 * | 3/2004 | Parker .............................. 725/38 |
| 2004/0088729 | A1 | 5/2004 | Petrovic et al. |
| 2004/0117831 | A1 | 6/2004 | Ellis et al. |
| 2004/0117857 | A1 | 6/2004 | Bisdikian et al. |
| 2004/0128699 | A1 | 7/2004 | Delpuch et al. |
| 2004/0255336 | A1 | 12/2004 | Logan et al. |
| 2005/0015803 | A1 | 1/2005 | Macrae et al. |
| 2005/0028203 | A1 | 2/2005 | Kim |
| 2005/0076389 | A1 | 4/2005 | Lee |
| 2005/0138656 | A1 | 6/2005 | Moore et al. |
| 2005/0149964 | A1 | 7/2005 | Thomas et al. |
| 2005/0157217 | A1 | 7/2005 | Hendricks |
| 2005/0177850 | A1 | 8/2005 | Boylan et al. |
| 2005/0198668 | A1 | 9/2005 | Yuen et al. |
| 2005/0204383 | A1 | 9/2005 | Boulanger |
| 2005/0227757 | A1 | 10/2005 | Simon |
| 2005/0232167 | A1 | 10/2005 | Gilbert et al. |
| 2005/0273830 | A1 | 12/2005 | Silver et al. |
| 2005/0283799 | A1 * | 12/2005 | Domegan et al. ................ 725/38 |
| 2006/0010470 | A1 | 1/2006 | Kurosaki et al. |
| 2006/0015903 | A1 | 1/2006 | MacBeth et al. |
| 2006/0080709 | A1 | 4/2006 | Kwon et al. |
| 2006/0184966 | A1 | 8/2006 | Hunleth et al. |
| 2006/0184989 | A1 | 8/2006 | Slothouber |
| 2006/0230427 | A1 | 10/2006 | Kunkel et al. |
| 2006/0236342 | A1 | 10/2006 | Kunkel et al. |
| 2007/0011702 | A1 | 1/2007 | Vaysman |
| 2007/0124773 | A1 | 5/2007 | Morris |
| 2007/0157221 | A1 | 7/2007 | Ou et al. |
| 2007/0157248 | A1 | 7/2007 | Ellis |
| 2008/0184296 | A1 | 7/2008 | Alten et al. |
| 2010/0077427 | A1 | 3/2010 | Helms et al. |
| 2010/0131983 | A1 | 5/2010 | Shannon et al. |
| 2010/0153999 | A1 | 6/2010 | Yates |
| 2010/0223642 | A1 | 9/2010 | Knudson et al. |
| 2011/0001879 | A1 | 1/2011 | Goldey et al. |
| 2012/0304066 | A1 | 11/2012 | Brodersen et al. |

FOREIGN PATENT DOCUMENTS

| | | |
|---|---|---|
| WO | WO 98/56176 | 12/1998 |
| WO | 00/05887 A1 | 2/2000 |
| WO | WO 00/05887 | 2/2000 |
| WO | 00/77752 A2 | 12/2000 |
| WO | 02/45304 A2 | 6/2002 |
| WO | WO 02/45304 | 6/2002 |
| WO | WO 2004/004322 | 1/2004 |
| WO | WO 2005/107245 | 11/2005 |
| WO | WO 2007/030380 | 3/2007 |
| WO | WO 2008/005383 | 1/2008 |

OTHER PUBLICATIONS

International Search Report and Written Opinion of the International Searching Authority dated Jun. 19, 2007 in International Application No. PCT/US2007/002870 in International counterpart application of U.S. Appl. No. 11/701,151, filed Feb. 1, 2007.

International Search Report and Written Opinion of the International Searching Authority dated Jun. 19, 2007 in International Application No. PCT/US2007/002765 in International counterpart application of U.S. Appl. No. 11/701,084, filed Feb. 1, 2007.

International Search Report and Written Opinion of the International Searching Authority dated Jan. 24, 2008 in International Application No. PCT/US2007/018535 in International counterpart application of U.S. Appl. No. 11/843,581, filed Aug. 22, 2007.

Final Rejection dated Mar. 4, 2010 in U.S. Appl. No. 11/716,268, filed Mar. 9, 2007 by David E. Feldstein et al.

Non-final Office action dated Jan. 6, 2011 in U.S. Appl. No. 11/953,576, filed Dec. 10, 2007 by David Eric Shanks et al.

International Search Report and Written Opinion dated Aug. 20, 2007 in International Application No. PCT/US2007/006066 filed Mar. 9, 2007 by David E. Feldstein et al.

Non-final Office Action dated Apr. 1, 2009 in U.S. Appl. No. 11/833,915, filed Aug. 3, 2007 by David E. Shanks et al.

International Search Report and Written Opinion of the International Searching Authority dated Feb. 27, 2008 in International counterpart Application No. PCT/US2007/018306 of U.S. Appl. No. 11/833,915, filed Aug. 3, 2007 by David Shanks et al.

Non-final Office Action dated Apr. 13, 2009 in U.S. Appl. No. 11/843,581, filed Aug. 22, 2007 by David Shanks et al.

Final Rejection dated Mar. 30, 2011 in U.S. Appl. No. 11/701,084 filed Feb. 1, 2007 by David Eric Shanks et al.

Non-final Office action dated Mar. 30, 2011 in U.S. Appl. No. 11/390,657, filed Mar. 28, 2006 by Richard F. Purpura et al.

Canadian Office action dated Mar. 3, 2010 in Canadian Patent Application No. 2,603,045 filed Mar. 27, 2006 by Richard F. Purpura et al.

Non-final Office action dated Apr. 26, 2010 in U.S. Appl. No. 11/953,576, filed Dec. 10, 2007 by David E. Shanks et al.

(56) References Cited

OTHER PUBLICATIONS

Extended European search report and European search opinion dated Apr. 21, 2010 in European Patent Application No. 06739674.7 filed Mar. 27, 2006 by Richard F. Purpura et al.
Final Rejection dated Mar. 27, 2009 in U.S. Appl. No. 11/390,657, filed Mar. 28, 2006 by Richard F. Purpura et al.
Non-final Office Action dated May 29, 2009 in U.S. Appl. No. 11/701,151, filed Feb. 1, 2007 by David E. Shanks et al.
Non-final Office Action dated May 28, 2009 in U.S. Appl. No. 11/701,084, filed Feb. 1, 2007 by David E. Shanks et al.
EPO Communication dated Jun. 4, 2009 in European Patent Application No. 07837016.0 filed Aug. 17, 2007 by David E. Shanks et al.
Non-final Office Action dated Aug. 12, 2009 in U.S. Appl. No. 11/716,268, filed Mar. 9, 2007 by David E. Feldstein et al.
Non-final Office Action dated Aug. 28, 2009 in U.S. Appl. No. 11/390,657, filed Mar. 28, 2006 by Richard F. Purpura et al.
Non-final Office action dated Jun. 23, 2010 in U.S. Appl. No. 11/716,268, filed Mar. 9, 2007 by David E. Feldstein et al.
Final Rejection dated Aug. 27, 2010 in U.S. Appl. No. 11/953,576 filed Dec. 10, 2007 by David E. Shanks et al.
EPO communication dated Jun. 17, 2010 in European Patent Application No. 07837189.5 filed Aug. 22, 2007 by David E. Shanks et al.
Non-final Office action dated Jun. 8, 2010 in U.S. Appl. No. 11/390,657, filed Mar. 9, 2007 by Mar. 28, 2006 by Richard F. Purpura et al.
Final Rejection dated Oct. 26, 2009 in U.S. Appl. No. 11/833,915, filed Aug. 3, 2007 by David E. Shanks et al.
Final Rejection dated Nov. 5, 2009 in U.S. Appl. No. 11/843,581, filed Aug. 22, 2007 by David Eric Shanks et al.
International Search Report and Written Opinion dated Nov. 24, 2008 in International Application No. PCT/US2007/006072 filed Mar. 9, 2007 by David E. Feldstein et al.
Final Rejection dated Nov. 27, 2009 in U.S. Appl. No. 11/701,151, filed Feb. 1, 2007 by David E. Shanks et al.
Final Rejection dated Dec. 1, 2009 in U.S. Appl. No. 11/701,084, filed Feb. 1, 2007 by David E. Shanks et al.
Non-final Office action dated Nov. 10, 2010 in U.S. Appl. No. 11/701,084, filed Feb. 1, 2007 by David E. Shanks et al.
Final Rejection dated Dec. 15, 2010 in U.S. Appl. No. 11/390,657, filed Mar. 28, 2006 by Richard F. Purpura et al.
Final Rejection dated Sep. 23, 2011 in U.S. Appl. No. 11/953,576 filed Dec. 10, 2007 by David E. Shanks et al.
Non-final Office action dated Jun. 6, 2011 in U.S. Appl. No. 11/701,151, filed Feb. 1, 2007 by David E. Shanks et al.
Mexican Office action dated Jun. 9, 2011 in Mexican Patent Application No. Mx/a/2009/001830 filed Aug. 17, 2007 by David E. Shanks et al.
Non-final Office action dated Aug. 3, 2011 in U.S. Appl. No. 11/701,084, filed Feb. 1, 2007 by David E. Shanks et al.
Final Rejection dated Sep. 14, 2011 in U.S. Appl. No. 11/833,915, filed Aug. 3, 2007 by David E. Shanks et al.
Mexican Office action dated Mar. 29, 2011 in Mexican Patent Application No. Mx/a/2009/001980 filed Aug. 22, 2007 by David E. Shanks et al.
EPO Summons to oral proceedings dated Mar. 15, 2011 in European Patent Application No. 07837189.5 filed Aug. 22, 2007 by David E. Shanks et al.
Non-final Office action dated May 25, 2011 in U.S. Appl. No. 11/833,915, filed Aug. 3, 2007 by David E. Shanks et al.
Non-final Office action dated Jun. 6, 2011 in U.S. Appl. No. 11/843,581, filed Aug. 22, 2007 by David E. Shanks et al.
Final Rejection dated Oct. 4, 2011 in U.S. Appl. No. 11/843,581, filed Aug. 22, 2007 by David E. Shanks et al.
Final Rejection dated Oct. 4, 2011 in U.S. Appl. No. 11/701,151, filed Feb. 1, 2007 by David E. Shanks et al.
Final Rejection dated Oct. 4, 2011 in U.S. Appl. No. 11/390,657, filed Mar. 28, 2006 by Richard F. Purpura et al.
Non-final Office action dated Jun. 18, 2012 in U.S. Appl. No. 11/833,915, filed Aug. 3, 2007 by David E. Shanks et al.
Final Rejection dated Jun. 6, 2012 in U.S. Appl. No. 11/701,151, filed Feb. 1, 2007 by David E. Shanks et al.
Non-final Office action dated Nov. 13, 2012 in U.S. Appl. No. 11/390,657, filed Mar. 28, 2006 by Richard F. Purpura et al.
Final Rejection dated Jan. 3, 2012 in U.S. Appl. No. 11/701,084, filed Feb. 1, 2007 by David E. Shanks et al.
Non-final Office action dated Jan. 4, 2012 in U.S. Appl. No. 11/953,576, filed Dec. 10, 2007 by David E. Shanks et al.
Non-final Office action dated Jan. 18, 2012 in U.S. Appl. No. 11/390,657, filed Mar. 28, 2006 by Richard F. Purpura et al.
Non-final Office action dated Jan. 12, 2012 in U.S. Appl. No. 11/701,151, filed Feb. 1, 2007 by David E. Shanks et al.
Final Rejection dated May 22, 2013 in U.S. Appl. No. 11/833,915, filed Aug. 3, 2007 by David E. Shanks et al.
Final Rejection dated Nov. 5, 2013 in U.S. Appl. No. 11/701,151, filed Feb. 1, 2007 by David E. Shanks et al.
Non-final Office action dated Oct. 3, 2013 in U.S. Appl. No. 11/833,915, filed Aug. 3, 2007 by David E. Shanks et al.
Non-final Office action dated Feb. 25, 2013 in U.S. Appl. No. 11/701,151, filed Feb. 1, 2007 by David E. Shanks et al.
Final Rejection dated Mar. 1, 2013 in U.S. Appl. No. 11/390,657, filed Mar. 28, 2006 by Richard F. Purpura et al.
Final Rejection dated Apr. 17, 2012 in U.S. Appl. No. 11/953,576, filed Dec. 10, 2007 by David E. Shanks et al.
Final Rejection dated Mar. 11, 2014 in U.S. Appl. No. 11/833,915, filed Aug. 3, 2007 by David E. Shanks et al.

\* cited by examiner

| SET 1 | | | | | Bama vs. WI-Mil | Bama vs. WI-Mil | Bama vs. WI-Mil | Bama vs. WI-Mil |
|---|---|---|---|---|---|---|---|---|
| Cell 1 | Ch. 705 | Indianapolis 1 | 12:20 PM | [2] Kentucky [15] E.Kentucky | UK vs. E KY | UK vs. E KY | UK vs. E KY | UK vs. E KY |
| Cell 2 | Ch. 706 | Cleveland 1 | 12:25 PM | [5] Alabama [12] Wisc.-Milwakee | OU vs. Niagara | OU vs. Niagara | OU vs. Niagara | OU vs. Niagara |
| Cell 3 | Ch. 707 | Boise 1 | 12:40 PM | [8] Pacific [9] Pittsburgh | Pacific vs. PITT | Pacific vs. PITT | Pacific vs. PITT | Pacific vs. PITT |
| Cell 4 | Ch. 708 | Tucson 1 | 12:45 PM | [3] Oklahoma [14] Niagara | | | | |
| | | | | Channel | 701 | 702 | 703 | 704 |
| | | | | Mix Channel Blackout start of day, timed event | [C1+B1+T1] | [I1+B1+T1] | [I1+C1+T1] | [I1+C1+B1] |
| | | | | A viewer can only see the Mix with his game blacked out, e.g., if UK vs. E. KY is on your CBS affil., you will only be able to see Ch. 701. | | | | |
| | | | | Set 2 games brought into Mix when last game of set 1 is Final. ***May be after some of Games in Set 2 have already begun. | | | | |

FIG. 4

DYNAMIC DETERMINATION OF PRESENTATION OF MULTIPLE VIDEO CELLS IN AN ON-SCREEN DISPLAY

BACKGROUND OF THE INVENTION

1. Field of the Invention

The present invention relates generally to satellite video systems, and in particular, to a method, apparatus, and article of manufacture for a dynamic determination of presentation of multiple video cells in an on-screen display.

2. Description of the Related Art

Satellite broadcasting of communications signals has become commonplace. Satellite distribution of commercial signals for use in television programming currently utilizes multiple feedhorns on a single Outdoor Unit (ODU), which supply signals to up to eight IRDs on separate cables from a multi switch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses systems and apparatuses for displaying a mosaic video channel on a monitor, with a plurality of individual video feeds being presented at a given time.

A mosaic video channel in accordance with the present invention comprises a plurality of video cells presenting at least video information, each video cell associated with one of the plurality of individual video feeds, a cursor, which is moveable between the plurality of video cells, for selecting at least one characteristic associated with a selected video cell, such that when a video program associated with the selected video cell is selected, the characteristic of the selected video cell is presented by the monitor, and a receiver, coupled to the monitor and receiving the plurality of video feeds and mosaic video channel, wherein a blackout criteria is dynamically programmed into the receiver such that when at least one of the video cells is selected by the cursor, the receiver tunes to a channel other than the individual video feed associated with the selected video cell.

Such a mosaic video channel further optionally includes a plurality of mosaic video channels, the receiver being granted access to a subset of the plurality of mosaic video channels at a time, the receiver being granted access to only one of the mosaic video channels at a time, the receiver being granted access to a specific mosaic video channel in the plurality of video channels based on a geographic location of the receiver, the specific mosaic channel access being based on a blackout rule, and the blackout rule being based on airing of a program on a network affiliate that is received by the receiver.

An apparatus in accordance with the present invention displays a mosaic video channel, the mosaic video channel having a plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented, wherein a blackout criteria is dynamically programmed into the receiver such that when at least one of the video cells is selected by the cursor, the receiver tunes to a channel other than the individual video feed associated with the selected video cell.

Such an apparatus further optionally includes the broadcast delivery system being a satellite television delivery system, a plurality of mosaic video channels, the receiver being granted access to a subset of the plurality of mosaic video channels at a time, the receiver being granted access to only one of the mosaic video channels at a time, the receiver being granted access to a specific mosaic video channel in the plurality of video channels based on a geographic location of the receiver, the specific mosaic channel access being based on a blackout rule, and the blackout rule being based on airing of a program on a network affiliate that is received by the receiver.

Another system in accordance with the present invention selectively displays a video cell within a mosaic video channel having a plurality of video cells, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented, wherein a blackout criteria is dynamically programmed into the receiver such that when at least one of the video cells is selected by the cursor, the receiver tunes to a channel other than the individual video feed associated with the selected video cell.

Such a system further optionally includes the broadcast delivery system being a satellite television delivery system, the blackout criteria granting access to a specific video cell within the mosaic video channel based on a geographic location of the receiver, the blackout criteria granting access to a specific video cell within the mosaic video channel based on a blackout rule, and the blackout criteria granting access to a specific video cell within the mosaic video channel based on an airing of a program on a network affiliate that is received by the receiver.

Other features and advantages are inherent in the systems and apparatuses disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 4 illustrates how the blackout games and mosaic channels are presented in an embodiment of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Interactive Mosaic Channel Display Diagram

Figure 1:
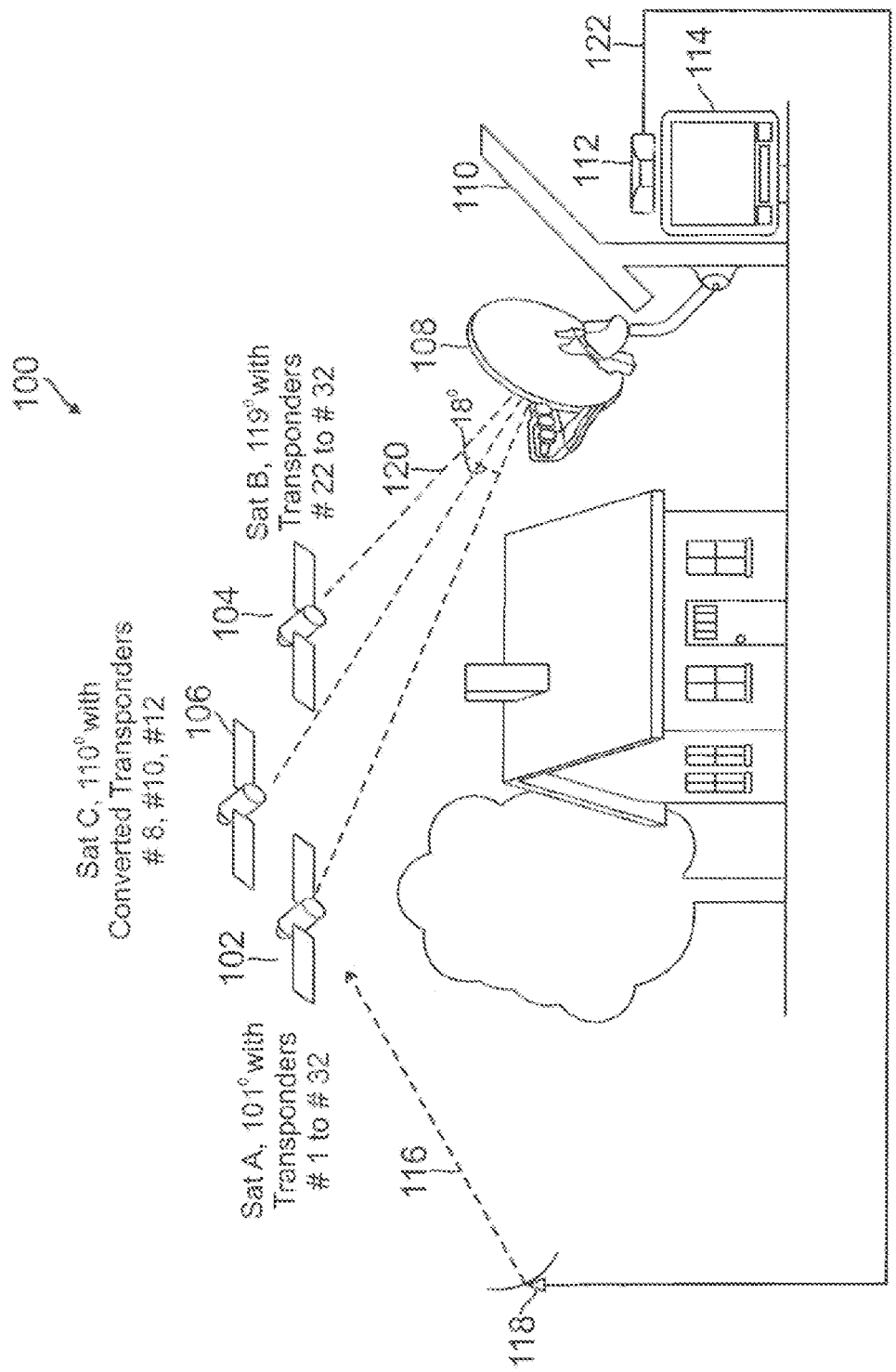
FIG. 1 illustrates a typical satellite television installation of the related art.
Figure 2A:
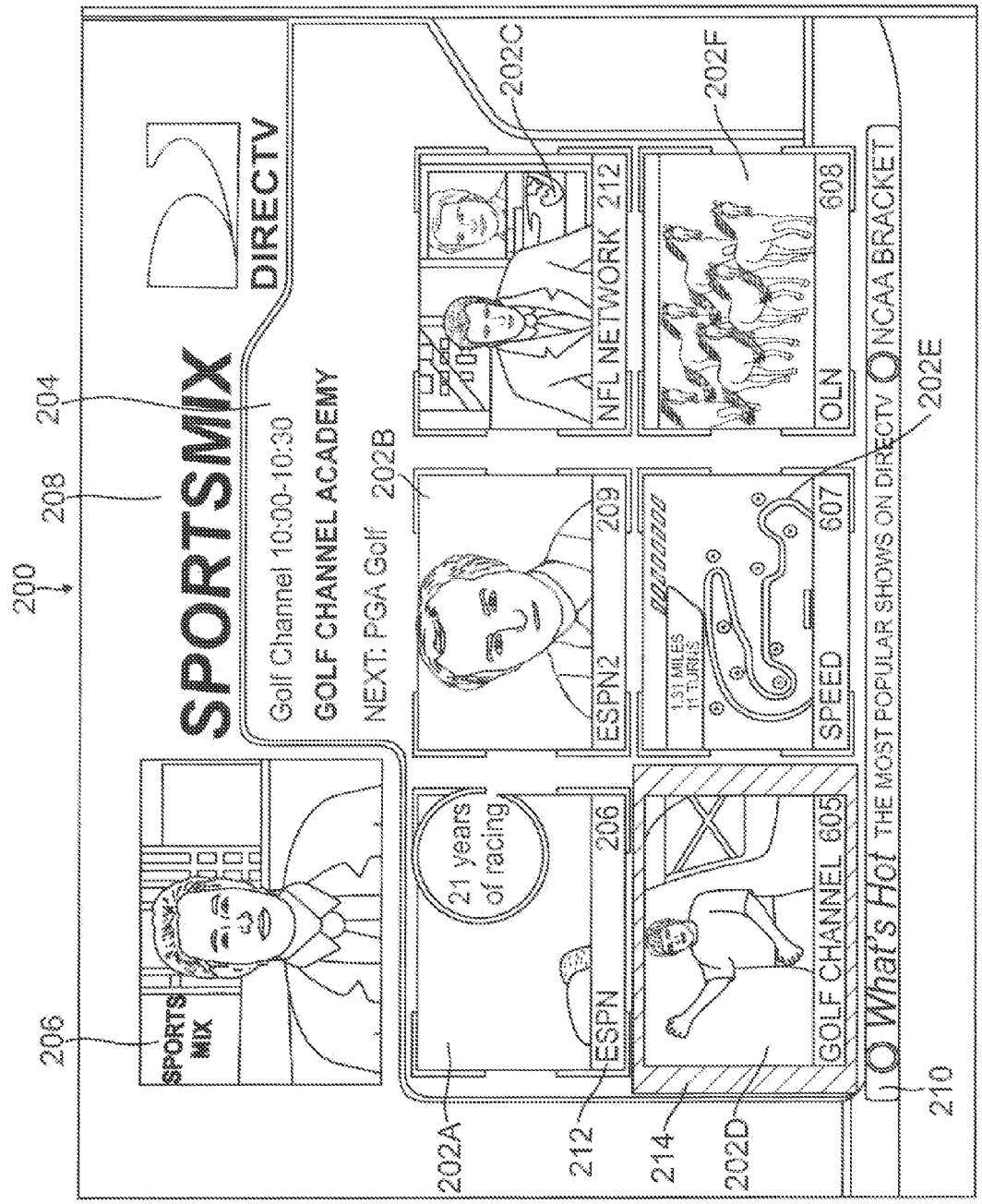
FIG. 2A illustrates a typical six-cell matrix with a generic video feed in accordance with the present invention.

FIG. 2A illustrates a typical matrix with a generic video feed in accordance with the present invention.

Interactive mosaic channel 200 is shown as being displayed on monitor 114. Within interactive mosaic channel 200, there are a number of video cells 202A-202F and a text box 204, also referred to as an On Screen Display (OSD) 204. Optionally, the interactive mosaic channel 200 further comprises a separate video cell 206, also called a "barker cell" 206, a background video 208, and a control bar 210. The video cells 202A-F optionally comprise a channel identification (channel ID) portion 212. Further, cursor 214 is also optionally included to allow for interaction with each of the video cells 202A-202F and barker cell 206.

The number of video cells 202A-F can change based on the number of video cells 202 A-F desired. As the number of video cells 202A-F increases, of course, there must be a reduction in the size of the video cells 202A-F to ensure that the video cells are differentiated on the monitor 114. As the number of video cells 202A-F decreases, the size of the video cells 202A-F can increase, since there is more space available on monitor 114 to display video cells 202A-F.

Further, the placement of video cells 202A-F, barker cell 206, text box 204, and control bar 210 is not limited to the positions on monitor 114 as shown in FIG. 2A. These elements can be displayed anywhere on monitor 114 without departing from the scope of the present invention.

As there are multiple video feeds and video cell 202A-F and barker cell 206 being presented, each video cell 202A-F and barker cell 206, as well as background video 208 and possibly control bar 210, have associated audio portions that can be played. Presenting more than one audio stream may be confusing; as such, it is typical that only one audio stream of information is presented at a given time. However, each of the video feeds may also have closed-captioning information associated with it, and selection of a closed-captioned presentation, rather than an audio presentation, can be performed as described herein.

Video Cells

Video cells 202A-F each comprise a separate viewer channel of programming. So for example, in an interactive mosaic channel that is focused on news programming, cell 1 could contain the video programming associated with the viewer channel of FOX News Channel, cell 2 could contain the video programming associated with the viewer channel of CNN, cell 3 could contain the video programming associated with the viewer channel of Headline News, cell 4 could contain the video programming associated with the viewer channel of MSNBC, cell 5 could contain the video programming associated with the viewer channel of The Weather Channel, and cell 6 could contain the video programming associated with the viewer channel of C-SPAN. The placement and video programming content for each video cell 202A-F can depend on a wide variety of factors, such as Nielsen ratings for a given channel, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 202F to video cell 202A for a period of time. Changes in presentation for the interactive mosaic channel 200 are discussed below.

Within each of the video cells 202A-F is a channel identification (ID) box 212. Typically, the channel ID box 212 indicates to the viewer the moniker or name that is associated with the video feed being shown in that respective video cell 202A-F, and the viewer channel number associated with the video feed being shown in that respective video cell 202A-F. For example and not by way of limitation, in video cell 202A, which as described above, is showing the video feed for ESPN, channel ID box 212 would indicate "ESPN" as well as, optionally, a channel number, e.g., "206" to indicate to the viewer that the video feed being shown in video cell 202A is that of ESPN, and that the viewer is accustomed to seeing this full-monitor 114 video programming on viewer channel 206.

Other information may also appear in channel ID box 212, such as an indication that the video feed that is being presented in the associated video cell 202A-F is a "user favorite" channel, the channel ID box 212 may be presented in a different color or video texture to indicate that the video feed that is being presented in the associated video cell 202A-F is a channel that presents programming that adults may wish to block from their children's view or has closed-captioning available, etc. Many possibilities are available within the scope of the present invention to present various types of video information within channel ID box 212 for viewer selection and benefit. The channel ID box 212 may also appear without a video cell 202A-F for those video feeds that are channel blocked via parental control, or otherwise unavailable to a specific viewer because of the viewer's programming package or other reasons.

Text Box

Text box 204 contains textual information that is useful to the viewer, and this information can change depending on the viewer's selection of interactive services as described herein. For example, the text box 204 can contain a generic statement about the genre of the interactive mosaic channel 200, or statements directed to a selected video cell 202A-F or information related to the channel ID box 212 to describe to a user the meaning of the information presented in the channel ID box 212 or other information related to the video cell 202A-F and channel ID box 212. The text box can also scroll to present additional information to the viewer that does not all fit within text box 204 at a given time.

There can also be default text associated with each interactive mosaic channel 200, and, depending on the capabilities of IRD 112, each time an interactive mosaic channel 200 is tuned to, a default descriptive text shall be displayed in the text box 204.

Barker Cell

Barker cell 206 is a presentation of video data that can relate to the video cells 202A-F that are present in interactive mosaic channel 200. For those interactive mosaic channels 200 that have the optional barker cell 206, the barker cell 206 can use audio or video clues to direct the user to one of the video cells 202A-F for more information on a given topic, or provide an overview of the information presented within the video cells 202A-F. For example, the audio and video associated with barker cell 206 in a news format can be a series of stories that are being covered in more depth on the viewer channels being shown in video cells 202A-F, and the barker cell 206 audio and video can then direct the viewer to tune the IRD 112 or monitor 114 to a specific video cell 202A-F for more information on that topic. The barker cell 206 can also be used to provide an overview of the news stories, either those presented in video cells 202A-F or other news stories of interest, without directing the viewer to one of the video presentations being discussed in the video feeds shown in video cells 202A-F.

Barker cell 206 can present audio and video information that is not available on any other viewer channel that is accessible to IRD 112 or monitor 114, other than within the barker cell 206 of the interactive mosaic channel 200. When the barker cell 206 presents audio and video information that is not present on any other viewer channel accessible to ID 112 or monitor 114, then the barker cell 206 does not have an associated channel ID box 212.

Background Video

Background video 208 is typically a backdrop for the interactive mosaic channel 200. The background video 208 can be related to the genre of the interactive mosaic channel 200; for example, in a news environment, the background video 208 can be related to a top news story, the stock market exchange building, a prominent government building, etc. The background video 208 can be changed or can be a dynamic video depending on the desires of the editorial staff or viewer preferences. Further, the background video 208 can be a logo or other indicator of the source of the interactive mosaic channel 200, such as DIRECTV.

Interactive Features

Figure 2B:
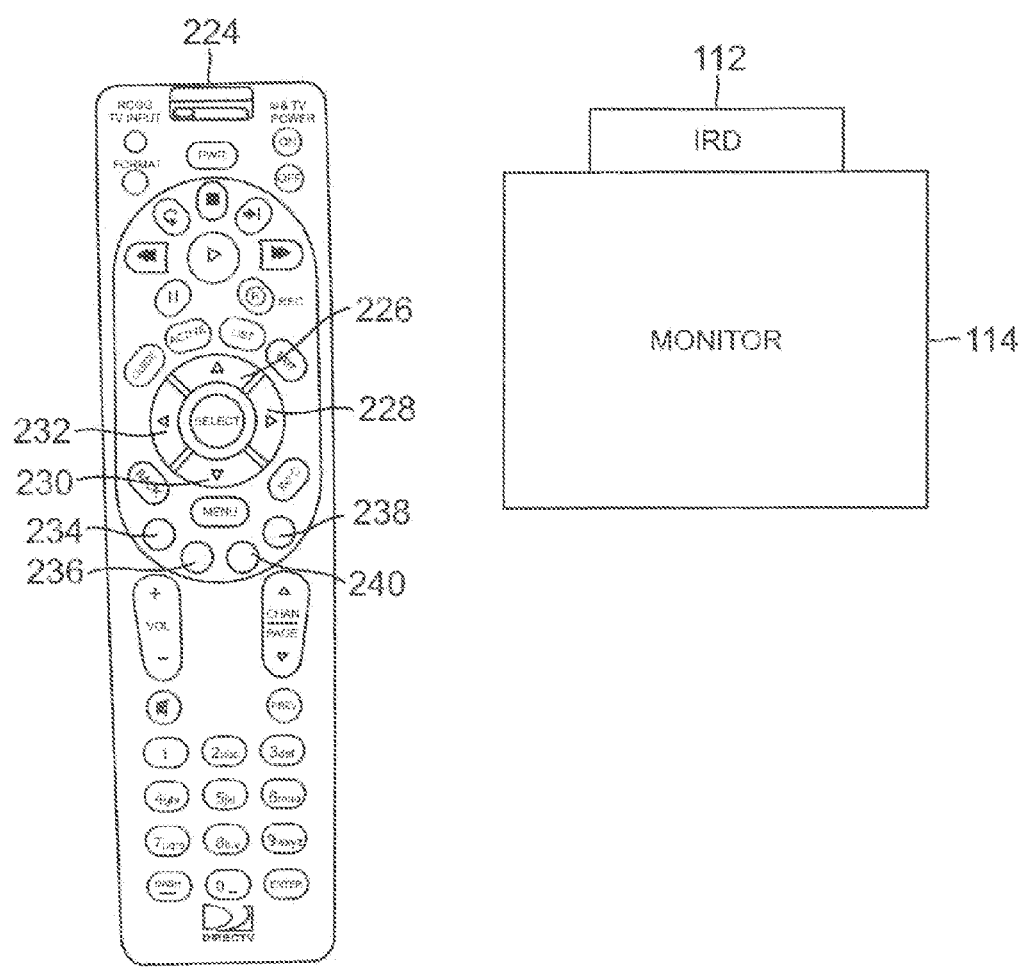
FIG. 2B illustrates a remote control used in the present invention.

FIG. 2B illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Each video cell 202A-F has an associated channel ID box 212, and one of the video cells, cell 202D, has a cursor 214 surrounding that specific video cell 202 and, optionally, channel ID box 212. The cursor 214 indicates that the specific video cell 202 and channel ID 212 has been selected by the viewer. The cursor 214 is typically controlled by buttons 226-232, but can be controlled by other buttons on the remote control 224 if desired.

By selecting a given video cell 202A-F, the viewer is selecting a specific characteristic associated with that given video cell 202A-F, or associated video feed used to generate that video cell 202A-F. In most instances, when the viewer selects a given video cell 202, the audio portion associated with the selected video cell 202 will be presented to the viewer, rather than the audio portion associated with the barker cell 206 or a generic audio track that is associated with interactive mosaic channel 200. Further, selection of a given video cell 202A-F with cursor 214 may also select a closed captioning data stream associated with the selected video cell 202, depending on the availability of such a data stream and/or other settings that a viewer has selected. Cursor 214 can be moved to any of the video cells 202A-F, and, optionally, can be moved to select text box 204 or control bar 210.

When cursor 214 is moved to a given video cell 202A-F via buttons 226-232, text box 204 also may undergo a change in information. Typically, when the video cell 202A-F is selected by the viewer, indicated by the presence of cursor 214, text box 204 will present the information in the Advanced Program Guide (APG) that is associated with the viewer channel selected by cursor 214. The APG typically includes information on the program or "show" that is currently being presented by the viewer channel shown in video cell 202A-F, as well as the time that show is being aired and the next show to be aired on that viewer channel. Other information, either in the APG or external to the APG, can also be displayed in the text box 204 when the cursor is moved to a given video cell 202A-F.

As such, the viewer can "interact" with the interactive mosaic channel 200 and decide which audio track to listen to, find out a plot line of each of the shows being presented in the various video cells 202, find out what is going to be aired next in the various viewer channels being presented in video cells 202, or listen to generic audio from the barker cell 206 or associated with the interactive mosaic channel 200 itself while variously viewing the video presentations in the video cells 202. If a specific video cell 202 presents video information that is of interest to a viewer, then the viewer can move cursor 214, via a remote control command, to a given video cell 202, and listen to the audio associated with that video cell 202 and find out more about that viewer channel in text box 204.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control 224 (typically the "select" button on a DIRECTV remote control). This will tune the IRD 112 or monitor 114 to that viewer channel, which will then be presented full-screen to the viewer as in a normal television monitor 114 viewing format.

The barker cell 206, since it typically contains audio and video information that is not located on any viewer channel other than the interactive mosaic channel 200, cannot typically be selected for full screen viewing by the viewer on monitor 114. However, the barker cell 206 can be selected for full monitor 114 viewing, or at least enough of the monitor 114 to allow for changes in the video cells 202 as described below, to allow for changes in the interactive mosaic channel 200 and in the control bar 210 in near-real-time.

Control Bar

The Control Bar 210 (also called the Attract Icon or the Attract Icon Bar) The control bar 210 allows for instant, on-screen access to several data sources that allow the viewer to access data related to that being shown in the video cells 202A-F as well as other viewer channels available within system 100. Those IRDs 112 that have interactive capabilities have special buttons that correspond to the icons that appear on the control bar 210. Each icon/button directs the viewer to a different screen, such as special events, or, in the case of the present invention, data related to real-time or near-real-time viewership of channels within system 100. Each screen can have sub-screens that further allow related data to be viewed or otherwise analyzed by the viewer.

For example, and not by way of limitation, one of the remote control 224 buttons, e.g., the "red" button 234, indicated by text and/or graphics on control bar 210, may take a viewer to the "What's Hot" page, where viewers can review data related to viewership of shows currently being aired within system 100.

Similarly, a "special" page can be accessed by pressing a different button on the remote control 224, e.g., the "green" button 236, or the blue button 238 or yellow button 240, where viewers can view a channel or other data page. The special page can be reprogrammed by the system provider or the viewer based on time, or, in the case of interactive mosaic channel 200, can be done by genre. For example, and not by way of limitation, the special page can be assigned to the NCAA bracket for a "Sports" mosaic channel 200, and, if the viewer changes to a "News" mosaic channel 200, the special page can be a breaking news channel or news recap video loop that is provided by the system provider. There can be more than one special "page" that is accessible from the buttons 234-240, or other buttons on the remote control 224, if desired.

Monitor Displays

Figure 3:
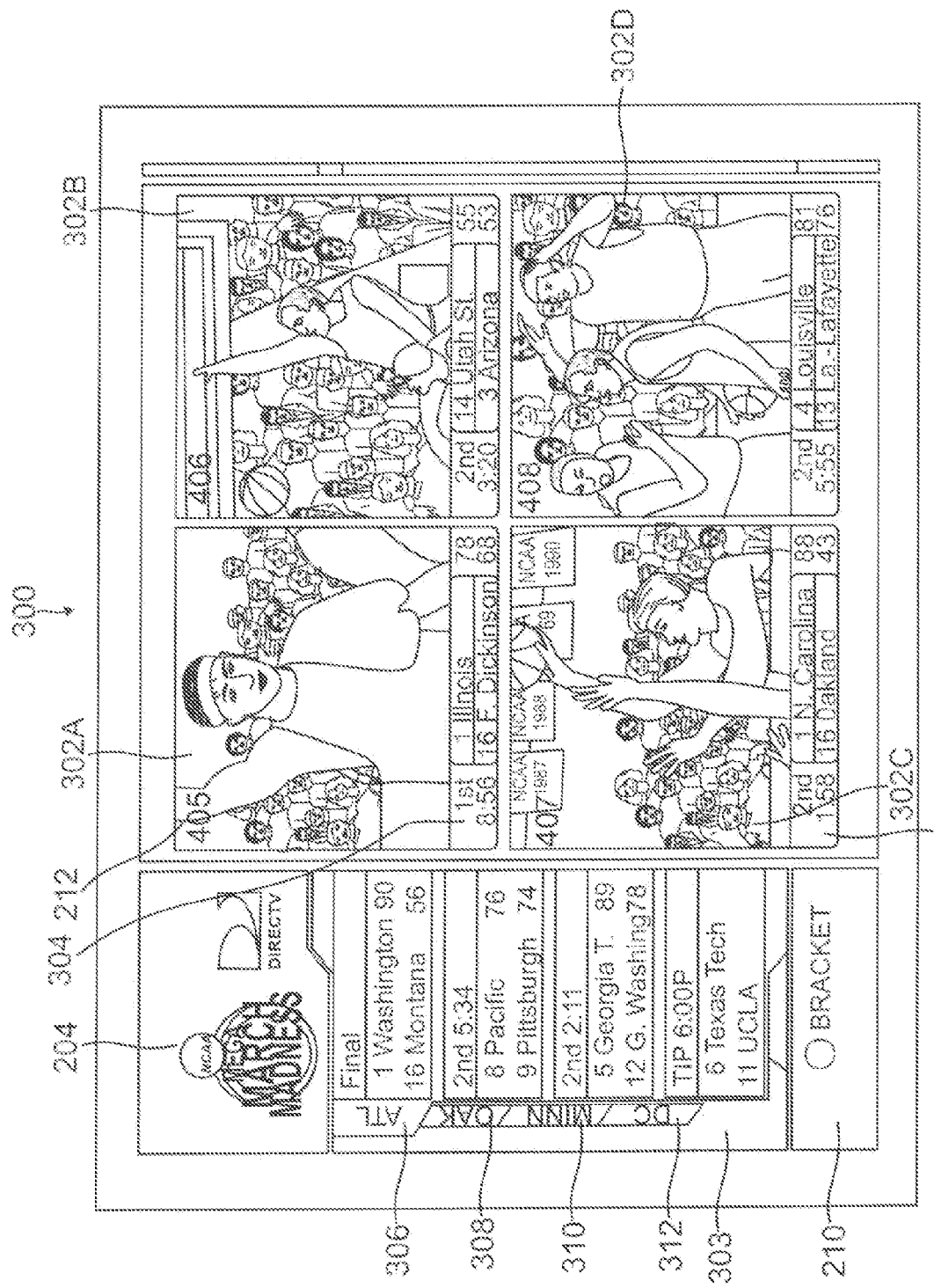
FIG. 3 illustrates on-monitor displays of a data presentation page in accordance with the present invention.

FIG. 3 illustrates an on-monitor display of data presentation pages in accordance with the present invention.

FIG. 3 illustrates screen 300, which comprises four video cells 302A-302D, text box 204, control bar 210, and summary area 303. Within video cells 302A-D, channel ID 212 is shown, along with data area 304.

Summary area 303 uses tabs 306-312 to provide different views of data that may be of interest to the viewer. By pressing one of the buttons 234-240, the viewer can maneuver between different tabs 306-312. For example, and not by way of limitation, tab 306 is uppermost as shown on screen 300, indicating to the viewer that the data associated with tab 306, namely, the games that are being contested in the Atlanta bracket of the NCAA Men's basketball tournament, is being displayed in summary area 303. When one of the buttons 234-240 is pressed, tab 308 will become uppermost, and the data associated with tab 308, namely, the games that are being contested in the Oakland bracket of the NCAA Men's basketball tournament, would be displayed in summary area 303.

For both summary area 303 and data area 304 of the video cells 302A-D, not only are scores indicated for each of the contested games, but the seeding of each of the teams, the time remaining in the game, whether the game is in the first or second half, and a current leader is indicated. The current leader can be indicated by a different color background, or different colored letters appearing within summary area 303 or data area 304, or other visual indicators that would provide that information to a viewer. Further, when the game enters a critical point, such as the final two minutes in a half or in the game, or when the game is in overtime, the time can be displayed with a different color or in bold or other visual clue to indicate to the viewer that a critical point in the game has been reached. For example, and not by way of limitation, in video cell 302C, the time remaining in the second half of the game is 1:58. This can be displayed in a red color, or with a red background, to quickly indicate to the viewer that the game is at a critical junction. The score for North Carolina, or the entire background behind the team name that is leading the game, can be displayed in a different color to indicate that they are leading. The viewer can then quickly determine whether the game that is at a critical junction should be viewed, which can be done by moving a cursor to the video cell 302A-D of interest and selecting that video cell, or whether the score, teams, or other issues associated with that game are not of interest to the viewer at that time.

The data within summary area 303 and data area 304 is typically maintained as live, up-to-the-minute data reports that provide current scores, times, and other data associated with either video cells 302A-D or other data that is typically related to video cells 302A-D by genre. For example, the data in summary area 303 is related to other games that are going on in the NCAA tournament, while the data in data area 304 is related to the video cells 302A-D that are displayed on screen 300.

Other indicators, such as that the game is completed, the game has not started, or there is a time-out in the game, are also possible displays of data within summary area 303 and data area 304.

Blackout Rules

Within screen 300, one or more of the contests that are presented in video cells 302A-D may be subject to "blackout" rules, where certain portions of a geographical area are not allowed to view the game, because it is being shown on the local network affiliate, or for other reasons. To accommodate this blackout provision, the present invention comprises using multiple mosaic channels 200, where a viewers has access to only one of the multiple mosaic channels 200, with the access for a given mosaic channel 200 determined by each viewer's current local broadcast network coverage.

To accommodate this, the present invention contemplates using dedicated mosaic channels 200, and dedicated channels for each contest that is currently in progress, such that the dedicated channels can be selectively combined into each of the mosaic channels 200 to avoid presenting the game that is being shown on the local network affiliate.

The present invention also contemplates an ending point for the access to the mosaic channels 200, at which time a special graphic may be shown on those channels to indicate that access has ended. Alternatively, the present invention can route a viewer to a data screen indicating results of the contests, or results of predictions made by the viewer for those contests already completed.

FIG. 4 illustrates how the blackout games and mosaic channels are presented in an embodiment of the present invention.

Chart 400 illustrates the video cells 402 that are used for each contest, channel number 404 that is assigned to each of the video cells 402, venue 406 for each of the contests, start time 408 for each of the contests, and participants 410 for each of the contests to be shown on the individual video cells 402 and mosaic channels 200. A plurality of mosaic channels 200, namely mosaic channels 412-418, are then filled with the video cells 402.

For example, and not by way of limitation, with regards to the NCAA Men's Basketball Tournament, four games are typically going on at any one time in a given region for the first round. So, for venues 406, there is one game in each venue at a given time, and these four games are then broadcast by the service provider on individual video cells 404 and on mosaic channels 412-418.

However, since the service provider provides service to a large geographic area, local broadcast affiliates are also showing the games that are being played. The IRD 112 needs to know which of the local affiliates are broadcasting the games, so that when a viewer selects that particular game as the one the viewer wants to watch, the IRD 112 knows which channel to tune to. When a game is "blacked out" on the mosaic channel, the IRD 112 must tune to the local broadcast affiliate channel, rather than the individual video cell 404 channel, because of Federal Communications Commission (FCC) rules or other contractual obligations of the service provider.

To properly inform the IRD 112 of which game is being shown on the local network affiliate in each geographic area, the IRD is allowed access to only one of the mosaic channels 412-418, and is informed that one of the video cells 302A-D, if selected, is a local channel, and which local channel that video cell 302A-D is, so that if a viewer selects that video cell 302A-D, the viewer will be direct tuned to the local affiliate channel rather than the individual video channel 404 associated with that video presentation.

For example, and not by way of limitation, mosaic channel 412 receives four individual video cells 404, one from each venue 406. The first game from the Indianapolis venue 406 is called "I1," the first game from the Cleveland venue 406 is called "C1," the first game from the Boise venue 406 is called "B1," and the first game from the Tucson venue 406 is called "T1."

On mosaic channel 412, IRDs 112 in certain geographic areas have the I1 game, namely, the University of Kentucky v. Eastern Kentucky game, being shown on their local network affiliate. Thus, the "I1" game is "blacked out" and a viewer that selects the "I1" game to view full screen on monitor 114 is direct tuned to the local network affiliate via IRD 112, rather than to the individual channel 404 that is also broadcasting the "I1" game.

Similarly, IRDs 112 in certain geographic areas have the C1 game, namely, the Alabama v. Wisconsin-Milwaukee game, being shown on their local network affiliate. Thus, the "C1" game is "blacked out" and a viewer that selects the "C1" game to view full screen on monitor 114 is direct tuned to the local network affiliate via IRD 112, rather than to the individual channel 404 that is also broadcasting the "C1" game.

However, where the I1 game is blacked out, that viewer is able to direct tune to the individual video channels 404 showing the C1, B1, and T1 games, rather than the local affiliate, and where the C1 game is blacked out, that viewer is able to direct tune to the individual video channels 404 showing the I1, B1, and T1 games, rather than the local affiliate. This geographical determination of which of the four games is blacked out is done by limiting IRD 112 access to only one of the plurality of mosaic channels 412-418, and informing the IRD 112 which of the four individual video channels 404 corresponds to the local affiliate network broadcast.

Similarly, IRDs 112 in other geographical areas have limited access to only one of the mosaic channels 412-418 based on which one of the four individual video channels 404 is blacked out in that geographical area. As shown in FIG. 4, the shaded video cell in each of the mosaic channels 412-418 is blacked out, and IRDs 112 can be given appropriate access to only one of the four mosaic channels 412-418 in order to provide proper direct tuning instructions for all IRDs 112.

A different number of video cells 404, and mosaic channels 412-418, can also be used within the scope of the present invention. For example, and not by way of limitation, six individual video channels 404 can be used, along with six mosaic channels 412-418, to allow for six geographical areas of blackout coverage or six individual contests, without departing from the scope of the present invention.

If desired, a graphic may be placed in the blacked out (shaded) video cell in mosaic channels 412-418 to indicate to a viewer that they can tune to each game full screen on their network broadcast affiliate, rather than running video from the network broadcast affiliate or the individual video channels 404.

For blacked out video cells 302A-D, the blacked out video cell 302A-D can also have a portion of the data associated with that video cell 302A-D blocked from the mosaic channel 412-418. For example, and not by way of limitation, the audio portion for the blacked out video channel can be blocked from that video cell 302A-D on that specific mosaic channel, e.g., mosaic channel 412 will not receive the audio for game I1.

When the games on a given mosaic channel, e.g., mosaic channel 412, are completed, the IRD 112 that has access to mosaic channel 412 may or may not continue to have access to mosaic channel 412, based on a new set of blackout rules that are applied to the geographical area that particular IRD 112 is located in. So, for example, once games I1, C1, B1, and T1 are completed, games I2, C2, B2, and T2 will start at some time later, and, a new set of blackout rules may apply. Rather than game I1 being blacked out, game C1 may be blacked out, in which case IRD 112 will no longer have access to mosaic channel 412, but instead will have access to another mosaic channel 414-418 depending on the blackout rule that is in effect. Although this change of mosaic channel 412-418 access typically occurs only at a change of video programming being displayed in mosaic channels 412-418, such a change can occur at any time based on the needs or desires of the system provider. Further, blackout rules can be lifted at any time, in which case IRD 112 can direct tune to one of the individual video channels 404 rather than a local broadcast affiliate.

A message can be displayed in text box 204, summary area 306, or elsewhere on screen 300 to inform viewers that the mosaic channel 412-418 access may change as new games are added or games are completed, and to check all of the mosaic channels 412-418 for the current availability. Other messages can be run on mosaic channels 412-418 to inform viewers that access has been temporarily denied.

CONCLUSION

A system in accordance with the present invention comprises a mosaic video channel displayed on a monitor, with a plurality of individual video feeds being presented at a given time. A mosaic video channel in accordance with the present invention comprises a plurality of video cells presenting at least video information, each video cell associated with one of the plurality of individual video feeds, a cursor, which is moveable between the plurality of video cells, for selecting at least one characteristic associated with a selected video cell, such that when a video program associated with the selected video cell is selected, the characteristic of the selected video cell is presented by the monitor, and a receiver, coupled to the monitor and receiving the plurality of video feeds and mosaic video channel, wherein a blackout criteria is dynamically programmed into the receiver such that when at least one of the video cells is selected by the cursor, the receiver tunes to a channel other than the individual video feed associated with the selected video cell.

Such a mosaic video channel further optionally includes a plurality of mosaic video channels, the receiver being granted access to a subset of the plurality of mosaic video channels at a time, the receiver being granted access to only one of the mosaic video channels at a time, the receiver being granted access to a specific mosaic video channel in the plurality of video channels based on a geographic location of the receiver, the specific mosaic channel access being based on a blackout rule, and the blackout rule being based on airing of a program on a network affiliate that is received by the receiver.

An apparatus in accordance with the present invention displays a mosaic video channel, the mosaic video channel having a plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented, wherein a blackout criteria is dynamically programmed into the receiver such that when at least one of the video cells is selected by the cursor, the receiver tunes to a channel other than the individual video feed associated with the selected video cell.

Such an apparatus further optionally includes the broadcast delivery system being a satellite television delivery system, a plurality of mosaic video channels, the receiver being granted access to a subset of the plurality of mosaic video channels at a time, the receiver being granted access to only one of the mosaic video channels at a time, the receiver being granted access to a specific mosaic video channel in the plurality of video channels based on a geographic location of the receiver, the specific mosaic channel access being based on a blackout rule, and the blackout rule being based on airing of a program on a network affiliate that is received by the receiver.

Another system in accordance with the present invention selectively displays a video cell within a mosaic video channel having a plurality of video cells, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented, wherein a blackout criteria is dynamically programmed into the receiver such that when at least one of the video cells is selected by the cursor, the receiver tunes to a channel other than the individual video feed associated with the selected video cell.

Such a system further optionally includes the broadcast delivery system being a satellite television delivery system, the blackout criteria granting access to a specific video cell within the mosaic video channel based on a geographic location of the receiver, the blackout criteria-granting access to a specific video cell within the mosaic video channel based on a blackout rule, and the blackout criteria granting access to a specific video cell within the mosaic video channel based on an airing of a program on a network affiliate that is received by the receiver.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A system for presenting a plurality of mosaic video viewer channels on a monitor, with a plurality of individual video feeds common to each of the mosaic video viewer channels being presented at a given time in each of the mosaic video viewer channels, comprising:

a plurality of video cells presenting at least video information separate from program guide information, each video cell associated with one of the plurality of individual video feeds;

a cursor, which is moveable between the plurality of video cells, for selecting at least one characteristic associated with a selected video cell, such that when a video program associated with the selected video cell is selected, the characteristic of the selected video cell is presented by the monitor; and a receiver, coupled to the monitor and receiving the plurality of video feeds and mosaic video viewer channel, wherein a blackout criteria is dynamically programmed into the receiver such that the receiver is selectively granted access to one of the mosaic video viewer channels in the plurality of mosaic video channels based on a geographic location of the receiver, wherein the selectively accessible mosaic video channel has at least one of the video cells that, when selected by the cursor, the receiver tunes to a channel other than the individual video feed associated with the selected video cell.

2. The system of claim 1, wherein the receiver is granted access to a subset of the plurality of mosaic video channels at a time.

3. The system of claim 1, wherein the specific mosaic channel access is based on a blackout rule.

4. The system of claim 3, wherein the blackout rule is based on airing of a program on a network affiliate that is received by the receiver.

5. An apparatus for displaying a plurality of mosaic video viewer channels, each mosaic video viewer channel having a plurality of video cells common to each of the mosaic video viewer channels being presented at a given time, comprising:

a broadcast delivery system, comprising a transmitter and a receiver;

a monitor, coupled to the receiver, for selectively displaying the mosaic video viewer channel separate from program guide information, each video cell associated with one of a plurality of individual video feeds; and a cursor, displayed on the monitor, which is movable between the plurality of video cells, for selecting at least one characteristic associated with a selected video cell, such that when a video program associated with the selected video cell is selected, the characteristic of the selected video cell is presented;

wherein a blackout criteria is dynamically programmed into the receiver such that the receiver is selectively granted access to one of the mosaic video channels in the plurality of mosaic video channels based on a geographic location of the receiver, wherein the selectively accessible mosaic video channel has at least one of the video cells selected by the cursor, the receiver tunes to a channel other than the individual video feed associated with the selected video cell.

6. The apparatus of claim 5, wherein the broadcast delivery system is a satellite television delivery system.

7. The apparatus of claim 5, wherein the receiver is granted access to a subset of the plurality of mosaic video channels at a time.

8. The apparatus of claim 5, wherein the blackout criteria is based on airing of a program on a network affiliate that is received by the receiver.

9. A system for selectively displaying a plurality of mosaic video viewer channels each mosaic video viewer channel having a plurality of video cells common to each of the mosaic video viewer channels, comprising:
- a broadcast delivery system, comprising a transmitter and a receiver;
- a monitor, coupled to the receiver, for selectively displaying the mosaic video viewer channel separate from program guide information, each video cell associated with one of a plurality of individual video feeds; and
- a cursor, displayed on the monitor, which is movable between the plurality of video cells, for selecting at least one characteristic associated with a selected video cell, such that when a video program associated with the selected video cell is selected, the characteristic of the selected video cell is presented;
- wherein a blackout criteria is dynamically programmed into the receiver such that the receiver is selectively granted access to one of the mosaic video channels in the plurality of mosaic video channels based on a geographic location of the receiver, wherein the selectively accessible mosaic video channel has at least one of the video cells selected by the cursor, the receiver tunes to a channel other than the individual video feed associated with the selected video cell.

10. The system of claim 9, wherein the broadcast delivery system is a satellite television delivery system.

11. The system of claim 10, wherein the blackout criteria grants access to a specific video cell within the selectively accessible mosaic video channel based on an airing of a program on a network affiliate that is received by the receiver.

\* \* \* \* \*